United States Patent [19]

Ichikawa

[11] Patent Number: 5,078,022
[45] Date of Patent: Jan. 7, 1992

[54] TILT TYPE STEERING APPARATUS

[75] Inventor: Mitsuo Ichikawa, Maebashi, Japan

[73] Assignee: Nippon Seiko Kabushiki Kaisha, Tokyo, Japan

[21] Appl. No.: 641,515

[22] Filed: Jan. 15, 1991

[30] Foreign Application Priority Data

Jan. 19, 1990 [JP] Japan .................. 2-3046[U]

[51] Int. Cl.$^5$ .................. B62D 1/18; G05G 1/00
[52] U.S. Cl. .................. 74/493; 74/540; 74/577 S; 280/775
[58] Field of Search .............. 74/493, 540, 541, 577 S; 280/775

[56] References Cited

U.S. PATENT DOCUMENTS

| 3,955,439 | 5/1976 | Meyer | 280/775 X |
| 3,977,692 | 8/1976 | Findley et al. | 280/775 |
| 4,391,159 | 7/1983 | Sellmeyer | 74/540 X |
| 4,594,909 | 6/1986 | Yamaguchi | 74/493 |
| 4,649,770 | 3/1987 | Arbouw | 74/540 X |
| 4,667,783 | 5/1987 | Sugano et al. | 192/4 A |
| 4,938,093 | 7/1990 | Matsumoto et al. | 74/540 X |

FOREIGN PATENT DOCUMENTS 60-144569 10/1985 Japan .
62-4470 8/1987 Japan .

Primary Examiner—Allan D. Herrmann
Assistant Examiner—David W. Laub
Attorney, Agent, or Firm—Shapiro and Shapiro

[57] ABSTRACT

A tilt type steering apparatus comprising a support bracket fixed to a vehicle body, a steering column having one end thereof pivotally supported on the support bracket by a first cross member, a first engagement member having first engagement teeth formed on the underside thereof forming an arcuate convex surface centering around the first cross member, the first engagement member being fixed to the underside of the steering column, a second engagement member having one end forming an arcuate convex surface centering around the first cross member, the first engagement member being fixed to the underside of the steering column, a second engagement member having one end thereof pivotally supported on a second cross member provided in the support bracket, and having second engagement teeth formed on the upper edge portion of the other end thereof, the second engagement teeth being engageable and disengageable with the first engagement teeth, a third cross member having an eccentric cam portion on that portion thereof which is opposed to the underside of the other end of the second engagement member and rotatably supported in the steering column under the second engagement member, arcuate follower teeth centering around the third cross member and secured to the third cross member in that portion thereof which deviates from the eccentric cam portion, and a tilt lever having arcuate driving teeth meshing with the follower teeth, the tilt lever being pivotally supported on the first cross member, whereby the first engagement teeth and the second engagement teeth can be brought into and out of engagement with each other by the rotation of the eccentric cam portion resulting from the pivotal movement of the tilt lever.

3 Claims, 4 Drawing Sheets

TILT TYPE STEERING APPARATUS

BACKGROUND OF THE INVENTION

1. Field of the Invention

This invention relates to a tilt type steering apparatus for an automobile, and in particular to improvements in a portion for pivotally supporting a steering column constituting the steering apparatus relative to a vehicle body, and achieves the compactness of a tilt adjusting portion.

2. Related Background Art

There is known a steering wheel height adjusting apparatus called a tilt type steering apparatus designed to be capable of changing the height of the steering wheel in conformity with a driver's constitution or driving posture.

As such a tilt type steering apparatus, there is known the apparatus disclosed in U.S. Pat. No. 4,594,909.

The tilt type steering apparatus described in this patent is of the so-called oscillating type in which, as shown in FIG. 1 of the accompanying drawings, a steering column 2 formed into a cylindrical shape to insert a steering shaft 1 thereinto is divided into a lower steering column 3 and upper steering column 4 and the two steering columns are connected together by a support bracket 5 mounted on a vehicle body. The upper steering column 4 is pivotable about cross members 6, 6 provided in the support bracket 5, by a mechanism as shown in FIGS. 2 to 4 of the accompanying drawings.

A restraining mechanism engageable by a tilt lever 7 pivotable about the cross members 6, 6 is provided between the support bracket 5 and the upper steering column 4 so that the upper steering column 4 can be coupled to the support bracket 5 (the pivotal movement of the upper steering column 4 can be made impossible) or the upper steering column 4 can be made displaceable relative to the support bracket 5 (the pivotal movement of the upper steering column 4 can be made possible).

More particularly one end of the upper steering column 4 is pivotally supported on the support bracket 5 by the cross members 6, 6 provided in the support bracket 5 fixed to the vehicle body on the underside or the like of a dashboard 8, and also a first engagement member 9 is fixed to the underside of the upper steering column 4. The underside of the first engagement member 9 forms an arcuate convex surface centering around the cross members 6, 6, and this underside is formed with first engagement teeth 10.

In addition one end (the left end as viewed in FIGS. 2 and 4) of a second engagement member 12 engageable with the first engagement member 7 with the pivotal movement of the tilt lever 7 is pivotally supported on another cross member 11 provided in the support bracket 5. The upper edge of the other end portion (the upper edge of the right end portion as viewed in FIG. 2) of the second engagement member 12 is formed with second engagement teeth 13 engageable with the first engagement teeth 10 formed on the underside of the first engagement member 9.

A roller 15 is supported on a shaft 14 provided in such a manner as to extend between the lower end portions of the tilt lever 7 having its intermediate portion pivotally supported on the cross members 6, 6, and the upper surface of the roller 15 bears against the underside of the second engagement member 12.

Further, an inclined slot 17 formed in a pivotable plate 16 fixed to the tilt lever 7 is engaged by a pin 18 protruding from a side of the second engagement member 12.

With the construction as described above, when the tilt lever 7 is pivotally moved counter-clockwise as viewed in FIG. 2, the roller 15 retracts from below the other end portion (the right end portion as viewed in FIG. 2) of the second engagement member 12 and at the same time, the other end portion of the second engagement member 12 is downwardly displaced on the basis of the engagement between the inclined slot 17 and the pin 18.

As a result, the engagement between the second engagement teeth 13 formed on the upper surface of the other end portion of the second engagement member 12 and the first engagement teeth 10 formed on the underside of the first engagement member 9 fixed to the underside of the upper steering column 4 is released (within a range in which a pin 19 projectedly provided on a side of the upper steering column 4 can be displaced inside an arcuate slot 20 formed in the support bracket 5). The upper steering column 4 thus becomes pivotable about the cross members 6, 6, whereby the height position of a steering wheel fixed to the end portion of the steering shaft 1 inserted in the upper steering column 4 becomes freely adjustable.

If the driver releases the tilt lever 7 after the height position of the steering wheel is adjusted in this manner, the tilt lever 7 will be pivotally moved clockwise as viewed in FIG. 2 by the tensile force of a tension spring 21 and the roller 15 will come into contact with the underside of the other end portion of the second engagement member 12 to push the other end portion of the second engagement member 12 upwardly. This brings the second engagement teeth 13 formed on the upper edge of said other end portion into engagement with the first engagement teeth 10 formed on the underside of the first engagement member 9 fixed to the underside of the upper steering column 4, thus preventing the upper steering column 4 from rotating about the cross members 6, 6.

As a result, the steering wheel is held in its adjusted height position. In this state, a resilient force urging the tilt lever 7 clockwise as viewed in FIG. 2 is imparted to the tilt lever 7 by the tension spring 21 and therefore, the roller 15 does not inadvertently retract from below the second engagement member 12.

In the case of the prior-art tilt type steering apparatus constructed and used as described above, in order to secure the rigidity of the shaft 14 to secure the strength of the meshing engagement between the first engagement teeth 10 and the second engagement teeth 13, the opposite end portions of this shaft 14 are suspended by a pair of suspension arms 22 and 22 having their upper end portions pivotally supported on the cross members 6, 6. Consequently, the structure for supporting the shaft 14 becomes complex and bulky and costs are increased.

The heretofore known oscillating tilt type steering apparatuses also include the apparatus disclosed in Japanese Laid-Open Utility Model Application No. 62-4470, but this apparatus has also suffered from a similar problem.

SUMMARY OF THE INVENTION

The tilt type steering apparatus of the present invention eliminates the above-noted inconvenience.

The tilt type steering apparatus of the present invention comprises a support bracket fixed to a vehicle body as in the aforedescribed prior-art tilt type steering apparatus, a steering column having one end thereof pivotally supported on said support bracket by a first cross member, a first engagement member having first engagement teeth formed on the underside thereof forming an arcuate convex surface centering around said cross member, said first engagement member being fixed to the underside of said steering column, a second engagement member having one end thereof pivotally supported on a second cross member provided in said support bracket and having second engagement teeth formed on the upper edge of the other end portion thereof and engageable with said first engagement teeth, and a tilt lever for bringing said first engagement teeth and said second engagement teeth into and out of engagement with each other with the pivotal movement thereof.

Further, in the tilt type steering apparatus of the present invention, a portion opposed to the underside of said second engagement member is made into an eccentric cam portion, and the steering apparatus has a third cross member rotatably supported on the underside of said second engagement member, arcuate follower teeth secured to a portion of said third cross member apart from said eccentric cam portion and centering around said third cross member, and arcuate driving teeth secured to a portion of said tilt lever and meshing with said follower teeth.

Said first engagement teeth and said second engagement teeth may be brought into and out of engagement with each other by the pivotal movement of said eccentric cam portion resulting from the pivotal movement of said tilt lever.

When the height position of a steering wheel is to be adjusted in conformity with the driver's constitution or the like by the tilt type steering apparatus of the present invention constructed as described above, the tilt lever is pivotally moved.

When the tilt lever is pivotally moved, the third cross member is rotated on the basis of the meshing engagement between the driving teeth and the follower teeth, and the distance between the center of rotation of the eccentric cam portion formed on the third cross member and the underside of the first engagement member varies.

As a result, the second engagement member supported by the outer peripheral surface of said eccentric cam portion somewhat pivotally moves about the second cross member, whereby the second engagement teeth formed on the upper edge of the other end portion of the second engagement member and the first engagement teeth on the underside of the first engagement member fixed to the underside of the steering column are brought into and out of engagement with each other.

DETAILED DESCRIPTION OF THE PREFERRED EMBODIMENTS

Figure 1:
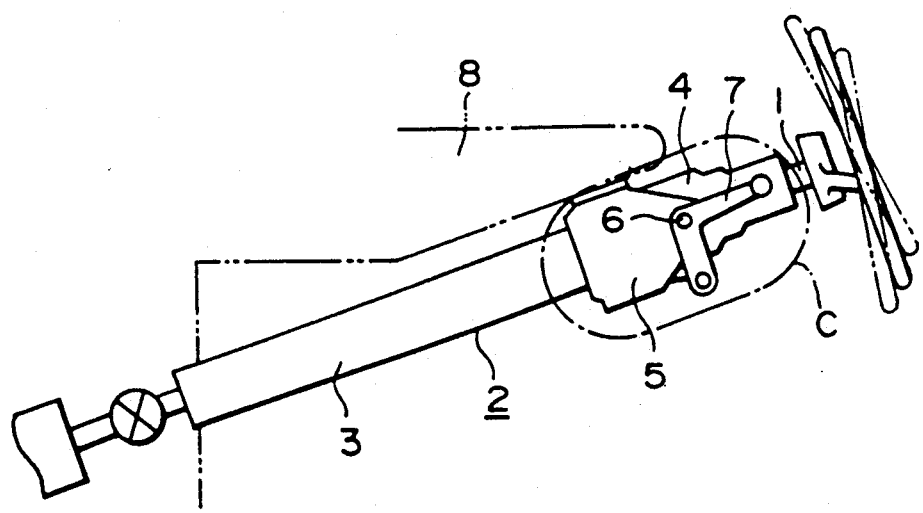
FIGS. 1 to 4 show an example of the tilt type steering apparatus according to the prior art, FIG. 1 being a side view showing the general construction thereof, FIG. 2 being a fragmentary longitudinal cross-sectional view showing the portion C of FIG. 1 on an enlarged scale, FIG. 3 being a cross-sectional view taken along line 3—3 of FIG. 2, and FIG. 4 being a view taken along the arrow E in FIG. 2.
Figure 2:
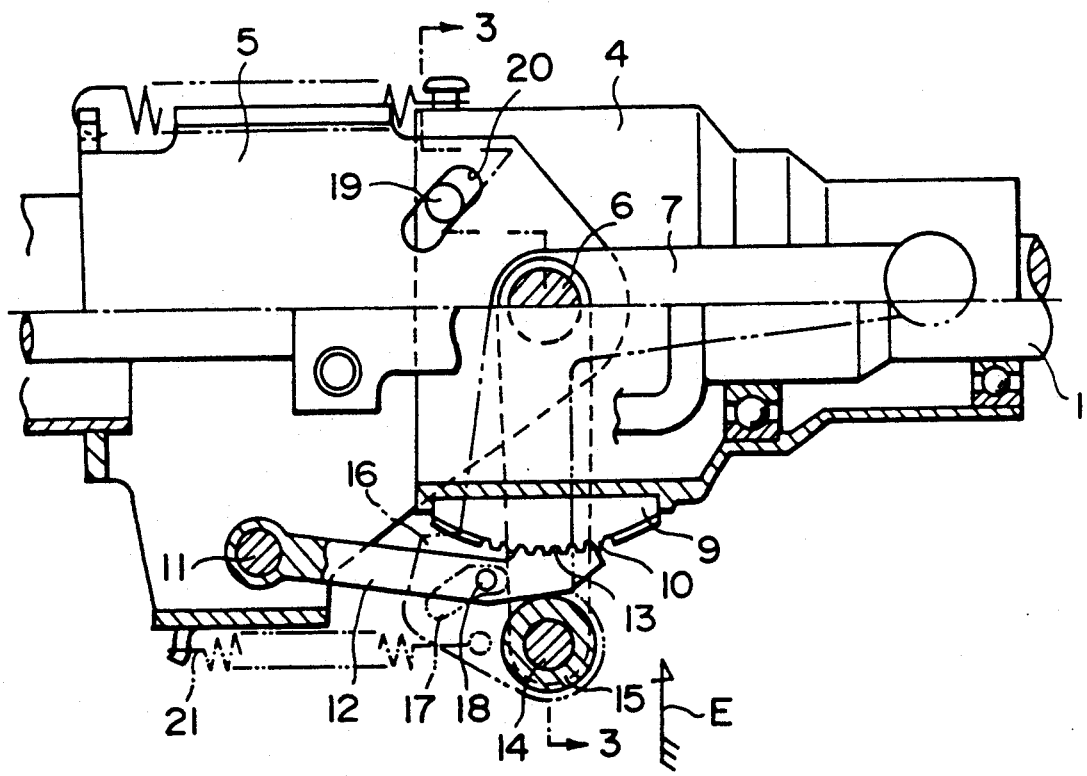
Figure 3:
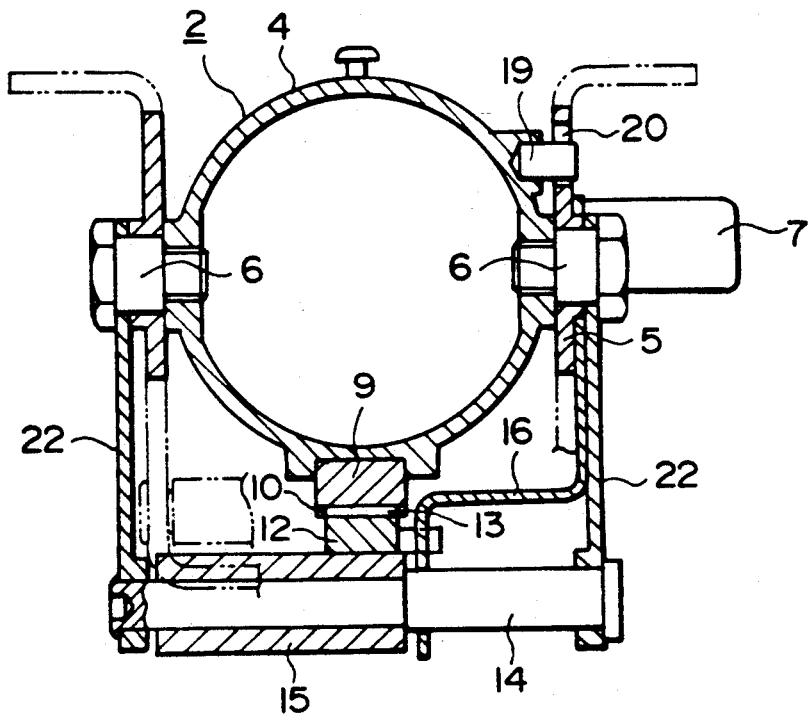
Figure 4:
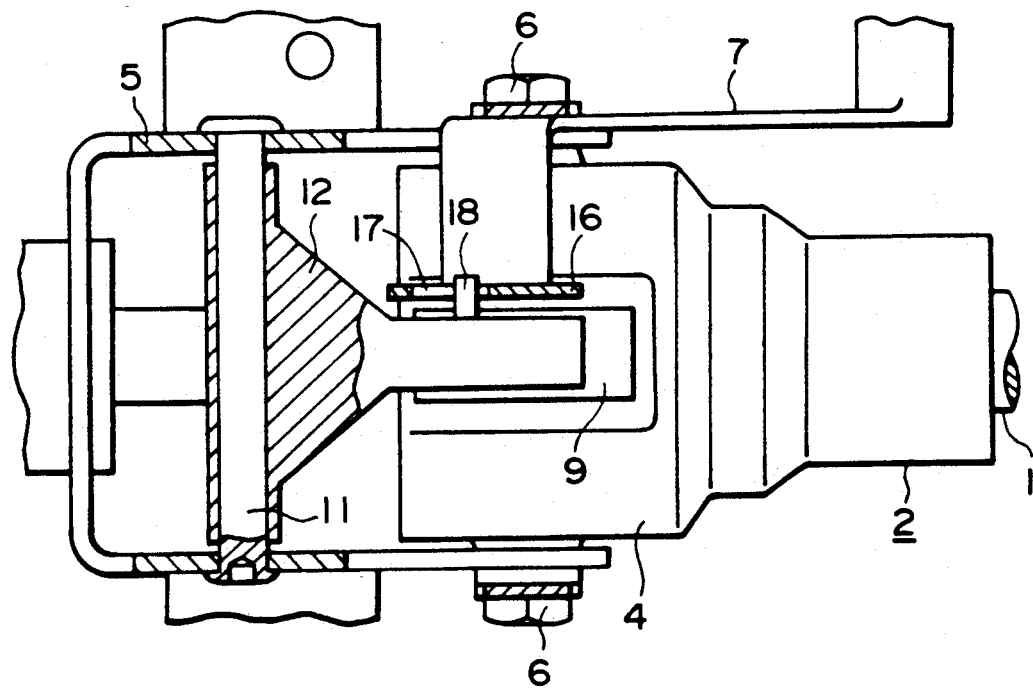

FIGS. 5 to 8 show an embodiment of the tilt type steering apparatus of the present invention.

The reference numeral 4 designates an upper steering column having one end thereof pivotally supported on a support bracket 23, fixed to a vehicle body, by a pair of right and left first cross members 24 and 24 provided in the support bracket 23.

A first engagement member 9' is fixed by welding to the underside of the upper steering column 4. The underside of the first engagement member 9' forms an arcuate convex surface centering around the first cross members 24, 24, and first engagement teeth 10' are formed on this underside.

A second cross member 25 is provided in a bracket fixed to a portion of the support bracket 23 which is forward of and below (leftward of and below as viewed in FIG. 5) the first cross members 24, 24, and one end of a second engagement member 12' is pivotally supported on the second cross member 25. Second engagement teeth 13' engageable with the first engagement teeth 10' are formed on the upper edge of the other end portion of the second engagement member 12', and engagement and disengagement between the first and second engagement teeth 10' and 13' may be effected by a tilt lever 26 which will be described later.

In the case of the tilt type steering apparatus of the present invention, a pair of support plates 27 and 27 are fixed by welding to the opposite sides of the first engagement member 9' and a third cross member 28 is supported in the pair of support plates 27 and 27 for rotation in a twist direction. The intermediate portion of the third cross member 28 which is sandwiched between the pair of supports plates 27 and 27 is made into an eccentric cam portion 31 having first and second flat surfaces 29 and 30 which are not parallel to each other.

This eccentric cam portion 31 is such that one end portion of the first flat surface 29 and one end portion of the second flat surface 30 are made proximate to each other and the other end portions of the two flat surfaces 29 and 30 are connected together by an arcuate portion 32. The center of this arcuate portion 32 is deviated from the center of rotation "a" of the third cross member 28.

A follower gear 34 generally formed into a sector shape is fixed to one end (the left end as viewed in FIG. 6) of the third cross member 28 which protrudes from the outer side of one support plate 27. Arcuate follower teeth 35 centering around the third cross member 28 are formed on the outer peripheral edge portion of the follower gear 34.

Figure 6:
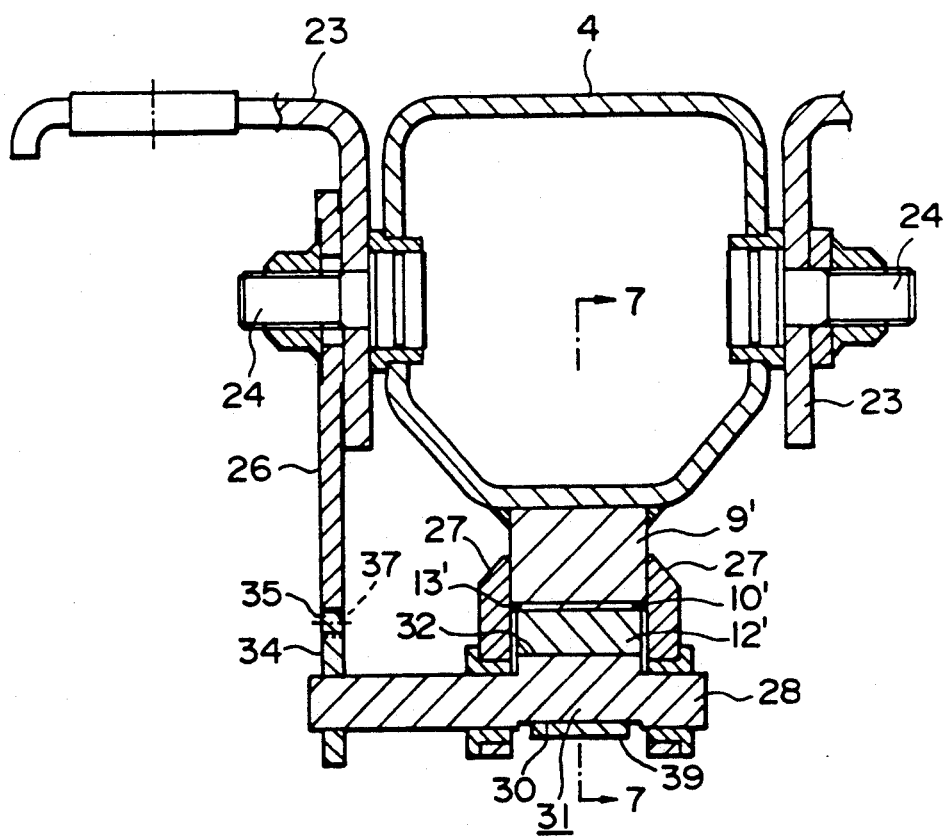

Further, the intermediate portion of a tilt lever 26 is pivotally supported on the outer side of the support bracket 23 by the utilization of the left first cross member 24, as is most clearly seen in FIG. 6.

One end of the tilt lever 26 substantially formed into an L-shape is freely operable as a grip portion 36 by the driver, and the lower edge of the other end portion thereof is formed with arcuate driving teeth 37 centering around the first cross member 24'. The and the driving teeth 37 and the follower teeth 35 are brought into meshing engagement with each other.

Thus, as the tilt lever 26 is pivotally moved about the left first cross member 24, the eccentric cam portion 31 is pivotally moved so as to bring the first engagement teeth 10' and the second engagement teeth 13' into or out of engagement with each other.

Figure 5:
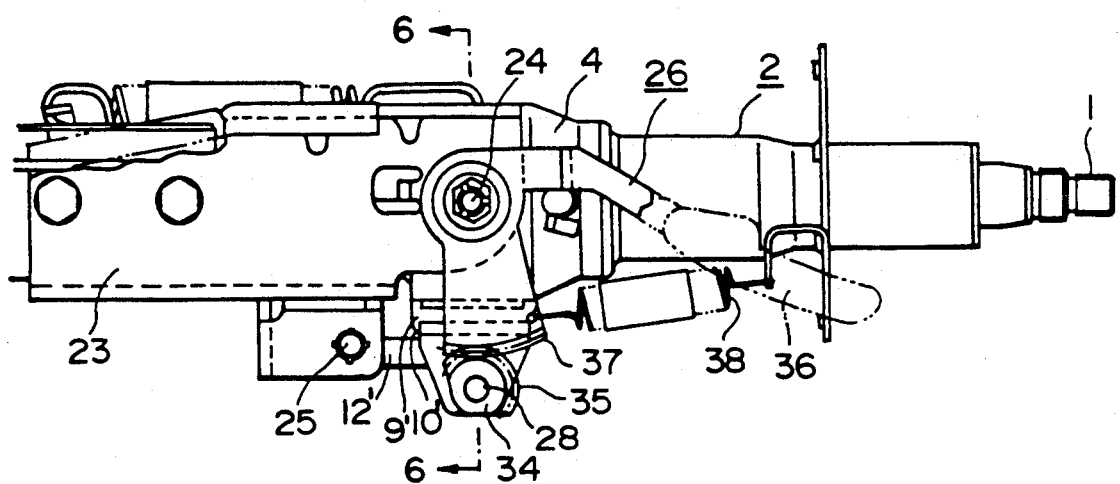
FIGS. 5 to 8 show an embodiment of the tilt type steering apparatus of the present invention, FIG. 5 being a side view showing the general construction thereof, FIG. 6 being a cross-sectional view taken along line 6—6 of FIG. 5, FIG. 7 being a cross-sectional view taken along line 7—7 of FIG. 6 and showing a state in which first and second engagement teeth are brought into engagement with each other, and FIG. 8 being a view similar to FIG. 7 but showing a state in which the first and second engagement teeth are brought out of engagement with each other.

A tension spring 38 is provided between the tilt lever 26 constructed as previously described and the end of the upper steering column 4 to impart to the tilt lever 26 a counter-clockwise spring force, as viewed in FIG. 5, so that unless any extraneous force acts, the third cross member 28 assumes a position in which the arcuate portion 32 of the eccentric cam portion 31 bears against the lower edge of the second engagement member 12'.

Further, the base end portion of a leaf spring 39 is supported on the underside of the second engagement member 12. The fore end portion of the leaf spring 39 is resiliently urged against the underside of the eccentric cam portion 31. The upper surface of the fore end portion of the leaf spring 39 and the second flat surface 30 of the eccentric cam portion 31 are adapted to be in intimate contact with each other when the arcuate portion 32 of the eccentric cam portion 31 bears against the lower edge of the second engagement member 12'.

In the case of the tilt type steering apparatus of the present invention constructed as described above, the tilt lever 26 is normally pivotally urged counter-clockwise as viewed in FIG. 5 by the spring force of the tension spring 38.

With counter-clockwise pivotal movement of the tilt lever 26, as after a height adjustment, the third cross shaft 28 rotates clockwise as viewed in FIG. 5 by virtue of the meshing engagement between the follower gear 34 fixed to the end portion of the third cross member 28 and the follower teeth 35. The arcuate portion 32 of the eccentric cam portion 31 formed on the intermediate portion of the third cross member 28 is thus brought to bear against the lower edge of the second engagement member 12'.

Figure 7:
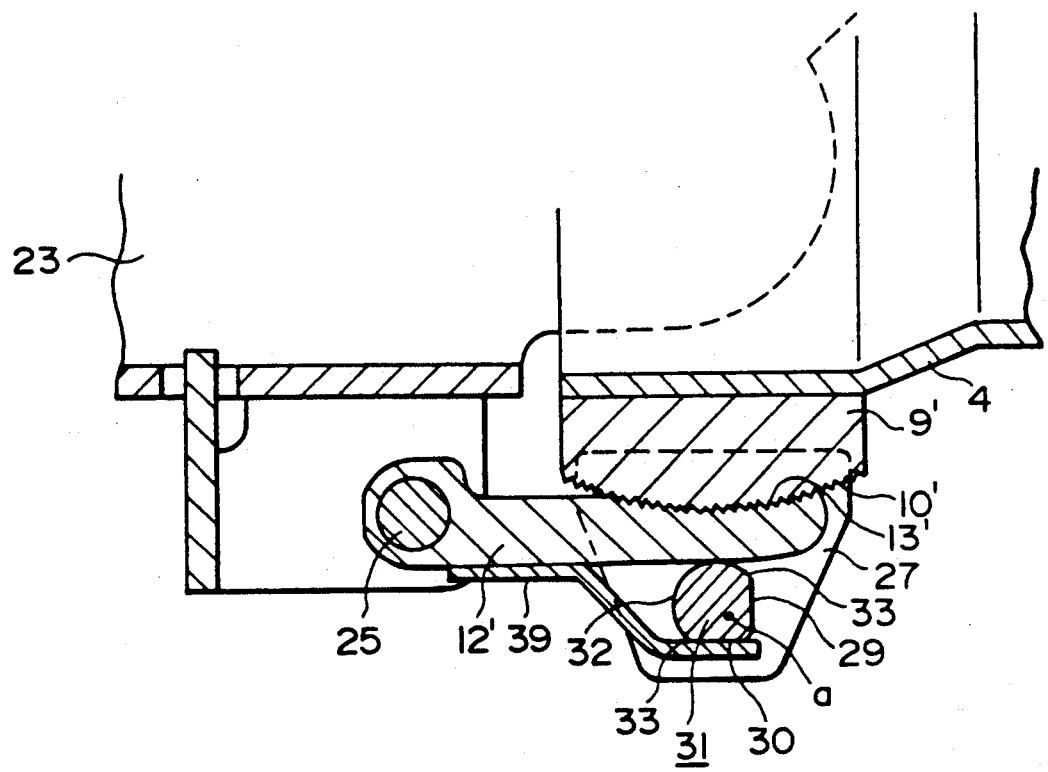

The distance between the center of rotation "a" of the third cross member 28 and the contacting points of arcuate portion 32 and second engagement member 12' increases with the clockwise rotation of the third cross member 28, and the second engagement member 12' pivotally moves counter-clockwise about the second cross member 25 as viewed in FIG. 5. As and as shown in FIG. 7, the second engagement teeth 13' formed on the upper edge of the fore end portion of the second engagement member 12 come into engagement with the first engagement teeth 10' of the first engagement member 9' fixed to the underside of the upper steering column 4. As a result, the upper steering column 4 does not pivotally move about the first cross member 24 and the height of the steering wheel is fixed in that position.

In this state, the fore end portion of the leaf spring 39 is in intimate contact with the second flat surface 30 of the eccentric cam portion 31 and therefore, stress acting on the leaf spring 39 is low. Further, due to the action of the tension spring 38, the third cross member 28 does not inadvertently rotate and thus, the engagement between the first and second engagement teeth 10' and 13' is not inadvertently released, whereby the steering wheel is not inadvertently moved up and down.

When the height position of the steering wheel is to be adjusted in conformity with the driver's constitution or the like, the tilt lever 26 is pivotally moved clockwise about the third cross member 28 as viewed in FIG. 5.

With the clockwise pivotal movement of the tile lever 26, the third cross member 28 rotates counter-clockwise as viewed in FIG. 5 on the basis of the meshing engagement between the driving teeth 37 secured to the tilt lever 26 and the follower teeth 35 of the follower gear 34 fixed to the end portion of the third cross member 28.

Figure 8:
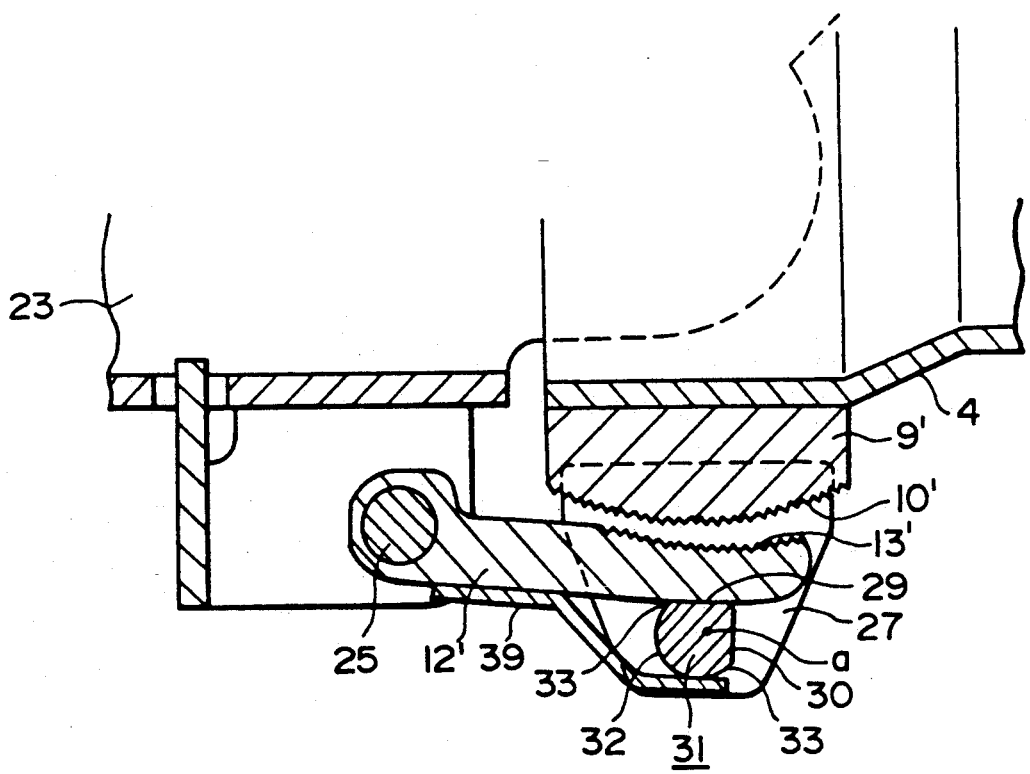

As a result of this rotation, as shown in FIG. 8, the first flat surface 29 formed on the outer peripheral surface of the eccentric cam portion 31 of the third cross member 28 and the lower edge of the second engagement member 12' tend to come into intimate contact with each other.

The distance from the center "a" of the third cross member 28 to the first flat surface 29 is smaller than the distance from said center "a" to the outer peripheral surface of the arcuate portion 32. Therefore, in the state in which the first flat surface 29 and the lower edge of the second engagement member 12' are intimate contact with each other, the second engagement member 12' pivotally supported on the second cross member 25 pivotally moves clockwise about the second cross member 25 as viewed in FIG. 5. Thus, and as shown in FIG. 8, the engagement between the second engagement teeth 13' formed on the upper edge of the other end portion of the second engagement member 12' and the first engagement teeth 10' on the underside of the first engagement member 9' fixed to the underside of the upper steering column 4 is released.

At this time, the second flat surface 30 of the eccentric cam portion 31 comes off the upper surface of the leaf spring 39 and therefore, the fore end portion of this leaf spring 39 tends to be pushed down. Thus, a spring force which trends to clockwisely rotate the second engagement member 12' to which the base end portion of the leaf spring 39 is fixed is imparted to the second engagement member 12' and it becomes easy for the first and second engagement teeth 10' and 13' come out of engagement with each other.

After the height position of the steering wheel has been adjusted with the engagement between the first and second engagement teeth 10' and 13' thus released, the tilt lever 26 is pivotally moved counter-clockwise as viewed in FIG. 5 by the spring force of the tension spring 38 to thereby again bring the second engagement teeth 13' and the first engagement teeth 10' into engagement with each other as shown in FIG. 7, thus preventing the upper steering column 4 from rotating about the first cross members 24, 24.

As a result, the steering wheel is held in its adjusted height position. In this state, a spring force which urges the tilt lever 26 counter-clockwise as viewed in FIG. 5 is imparted to the tilt lever 26 by the tension spring 38 and also, the upper surface of the fore end portion of the leaf spring 39 and the second flat surface 30 of the eccentric cam portion 31 come into intimate contact with each other. Therefore, as previously described, the engagement between the engagement teeth 10' and 13' is not inadvertently released.

As will be appreciated from the preceding description, the tilt type steering apparatus of the present invention incorporates a structure of the restraining mechanism which is simple, which can be made compact, and which can reduce the cost of the tilt type steering apparatus.

I claim:

1. A tilt type steering apparatus including:

a support bracket fixed to a vehicle body;

a steering column having one end thereof pivotally supported on said support bracket by a first cross member;

a first engagement member having first engagement teeth formed on an underside thereof forming an arcuate convex surface centering around said first cross member, said first engagement member being fixed to an underside of said steering column;

a second engagement member having one end thereof pivotally supported on a second cross member provided in said support bracket, and having second engagement teeth formed on an upper edge portion of another end thereof, said second engagement teeth being engageable with and disengageable from said first engagement teeth;

a third cross member having an eccentric cam portion on a portion which is opposed to an underside of said another end of said second engagement member and rotatably supported in said steering column under said second engagement member;

arcuate follower teeth centering around said third cross member in a portion thereof apart from said eccentric cam portion; and a tilt lever having arcuate driving teeth meshing with said follower teeth, said tilt lever being pivotally supported on said first cross member, whereby said first engagement teeth and said second engagement teeth are brought into and out of engagement with each other by rotation of said eccentric cam portion resulting from pivotal movement of said tilt lever.

2. A tilt type steering apparatus according to claim 1, further including a leaf spring having a base end portion supported by the underside of said second engagement member and having a fore end portion resiliently biasing the underside of said eccentric cam portion, said eccentric cam portion having first and second flat surfaces which are not parallel to each other provided on an outer peripheral surface thereof.

3. A tilt type steering apparatus according to claim 1, further including a pair of support plates fixed to opposite sides of said first engagement member with said eccentric cam portion interposed therebetween, said third cross member being pivotally supported by one of said support plates at one end portion thereof and pivotally supported by the other support plate at an intermediate portion thereof, and having at another end portion thereof a follower gear having said follower teeth.

* * * * *